US009796341B1

(12) United States Patent
Anderson

(10) Patent No.: US 9,796,341 B1
(45) Date of Patent: Oct. 24, 2017

(54) RATCHET STRAP KIT

(71) Applicant: Erik Edward Anderson, Cleveland, TN (US)

(72) Inventor: Erik Edward Anderson, Cleveland, TN (US)

(*) Notice: Subject to any disclaimer, the term of this patent is extended or adjusted under 35 U.S.C. 154(b) by 0 days.

(21) Appl. No.: 15/638,003

(22) Filed: Jun. 29, 2017

Related U.S. Application Data

(60) Provisional application No. 62/414,758, filed on Oct. 30, 2016.

(51) Int. Cl.
*B60P 7/00* (2006.01)
*B60R 9/048* (2006.01)
*B25B 25/00* (2006.01)
*B60P 7/08* (2006.01)

(52) U.S. Cl.
CPC .............. *B60R 9/048* (2013.01); *B25B 25/00* (2013.01); *B60P 7/083* (2013.01)

(58) Field of Classification Search
CPC ........... B60R 9/048; B25B 25/00; B60P 7/083
USPC .................. 410/12, 50, 100, 103; 24/68 CD; 254/214, 380; 242/170; 220/4.31, 23.2, 220/23.4, 524
See application file for complete search history.

(56) References Cited

U.S. PATENT DOCUMENTS

| 6,290,440 B1* | 9/2001 | DiViccaro | B60P 7/0823 410/101 |
| 7,334,972 B2* | 2/2008 | Cash | B60P 3/064 410/100 |
| 7,431,548 B2* | 10/2008 | Acton | B60P 7/0807 410/103 |

* cited by examiner

*Primary Examiner* — Stephen Gordon
(74) *Attorney, Agent, or Firm* — Frank Marino

(57) ABSTRACT

A container and a securement strap are disclosed. The securement strap includes a crank. The container has a housing and a lid. The housing has a hollow interior adapted to receive the securement strap. The hollow interior is surrounded by a bottom wall and sidewalls to contain the securement strap, and has an open top to receive the securement strap into the hollow interior. At least one of the sidewalls has a hole therethrough. The lid is attached to the housing at the open top by a hinge. The lid being pivotable relative to the housing about the hinge between a closed position wherein access to the hollow interior is denied and an opened position in which access to the hollow interior is enabled. The lid is latchable to the housing to deny pivoting relative thereto and thereby deny receipt and removal of the securement strap. The hole is shaped and disposed to allow the crank to pass there-through to the exterior of the housing when the securement strap is received into the hollow interior, such that the crank may be used as a handle for carrying the combination.

7 Claims, 6 Drawing Sheets

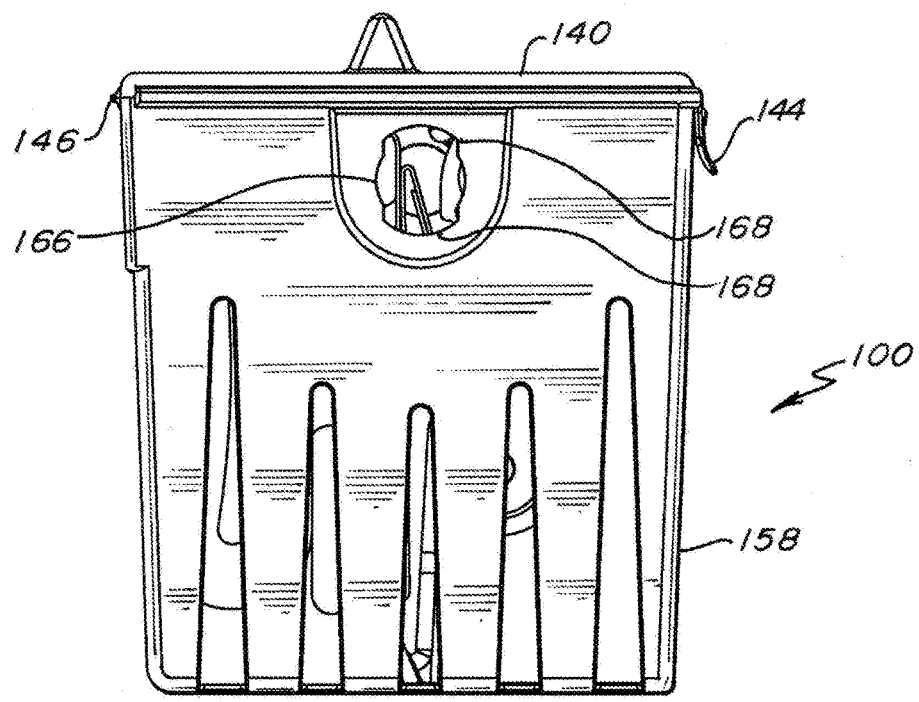
Fig.10
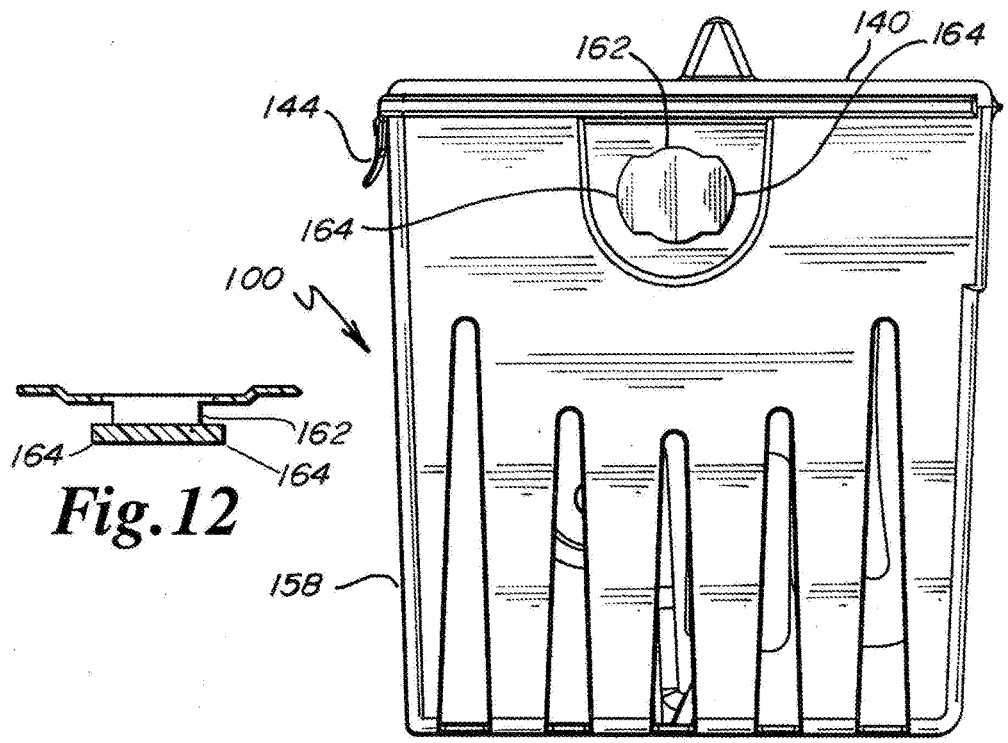
Fig.12
Fig.11

RATCHET STRAP KIT

RELATED APPLICATIONS

This application claims all entitled Priority to U.S. Provisional Application No. 62/414,758 filed on 30 Jun. 2016, the entire teachings of which are incorporated herein by reference.

FIELD OF THE INVENTION

The present invention is related to devices and systems for securing one or more objects to one or more others. More specifically, the present invention is related to securement straps, such as ratcheting straps, for securing one or more articles, such as to or within a vehicle.

BACKGROUND

Ratcheting straps can be used to secure a wide variety of objects to various support surfaces and/or to various other objects. Typically, such straps are used to keep an object from falling or moving relative to a vehicle during transport. Such ratcheting straps typically have two portions; a free strap sub-assembly, and a ratcheting strap sub-assembly. Each sub-assembly has a hook at one end which attaches to say an immovable feature in or on the vehicle. The free strap sub-assembly has a long webbing with its hook at one end. The ratcheting strap sub-assembly has a short webbing with its hook at one end and a ratcheting mechanism at the other end. The non-hook end of the free strap sub-assembly's long webbing is fed into the ratcheting sub-assembly and adjusted to near its intended final length, then the hooks are secured to the vehicle and the long webbing is wrapped loosely around the object and the ratcheting mechanism is activated to reel in the slack of the long webbing and tightly secure the object to the vehicle. Such ratcheting straps are exemplified by U.S. Pat. Nos. 5,271,606 and 7,874,047, the entire teachings of which are incorporated herein by reference.

Users feed the webbing into the ratcheting mechanism prior to use. Because prior art ratchet straps lack any effective means for efficiently and neatly being stored, except for rolling the webbing up around the ratcheting mechanism and wrapping with an elastic band or such, users often release and remove the webbing therefrom after every use. The two portions are then stored for future use by rolling up the free strap sub-assembly and placing it and the "dangly" ratcheting strap sub-assembly under the vehicle's seat or in the trunk.

Obviously, this storage arrangement poses problems, not limited to the inability to find both assemblies when needed, the unrolling of the free strap sub-assembly and tangling thereof with other items in nearby storage, the catching of one of the hooks on the underside of the car seat, the unrolling and tangling of the free strap sub-assembly with itself, the intrusion of sand and grime into the ratcheting mechanism and the resulting malfunction thereof caused thereby, and the general messiness caused by having such assemblies strewn about the vehicle.

An additional problem very familiar to users of such ratcheting straps is that a user's method of rolling up and storing the device is inconsistent, or typically differs from the next user's, and it is therefore cumbersome and confusing to properly reassemble the two assemblies into the same configuration. Even when the same object is to be secured in the same position in the same vehicle, it can take several minutes to arrange the ratcheting strap into the same configuration used the previous time.

Accordingly, there is a need, and it is an object of the invention, to provide a means for simply and consistently storing a ratcheting strap. There is a need, and it is an object of the invention, to provide such a means that allows the user to leave the ratcheting strap assemblies connected as last used during such storage. There is a need, and it is an object of the invention, to provide such a means that minimizes the space required for such storage. There is a need, and it is an object of the invention, to provide such a means that neatens such storage. There is a need, and it is an object of the invention, to provide such a means that prevents the hooks from getting caught on other features within the vehicle. There is a need, and it is an object of the invention, to provide such a means that protects the ratcheting strap, and particularly the ratcheting mechanism during such storage. There is a need, and it is an object of the invention, to provide such a means that is simply affixable to additional such means so that numerous such ratcheting straps may be stored compactly and neatly together.

Further needs and objects exist which are addressed by the present invention, as may become apparent by the included disclosure of an exemplary embodiment thereof.

SUMMARY OF THE INVENTION

The invention may be embodied in or practiced using a ratcheting strap kit consisting of such a ratcheting strap as referred to above together with a storage container shaped and arranged to receive the ratcheting strap in a configuration that addresses the afore-stated problems and addresses the afore-stated needs.

The invention may be embodied in or practiced using, in combination, a container and a securement strap. The securement strap may have a crank. The container may include a housing and a lid. The housing may have a hollow interior adapted to receive the securement strap, the hollow interior may be surrounded by a bottom wall and sidewalls to contain the securement strap, and an open top to receive the securement strap into the hollow interior. At least one of the sidewalls may have a hole therethrough. The lid may be attached to the housing at the open top by a hinge. The lid may be pivotable relative to the housing about the hinge between a closed position wherein access to the hollow interior is denied and an opened position in which access to the hollow interior is enabled. The lid may be latchable to the housing to deny pivoting relative thereto and thereby deny receipt and removal of the securement strap. The hole may be shaped and disposed to allow the crank to pass there-through to the exterior of the housing when the securement strap is received into the hollow interior, such that the crank may be used as a handle for carrying the combination.

The securement strap may be a ratcheting strap having a free strap sub-assembly and a ratcheting strap sub-assembly selectably connectable thereto and disconnectable therefrom. The free and ratcheting strap assemblies may be storable within the hollow interior such that the crank may be used as a handle for carrying the combination both when the free and ratcheting strap assemblies are connected to each other and when the free and ratcheting strap assemblies are disconnected from each other.

A first of the sidewalls may be a front sidewall and the hole may be through the front sidewall so that the crank may be used as a frontal handle for carrying the combination.

A second of the sidewalls may be a right sidewall and a third of the sidewalls may be a left sidewall oppositely-disposed from the right sidewall, and one of the right and left sidewalls may include a first connector portion and the other of the right and left sidewalls may include a second connector portion. The first and second connector portions may be matable to enable an identical housing to be connectable with the housing in a side-by-side arrangement thereby.

The first connector portion may be a male connector portion and the second connector portion may be a female connector portion adapted to receive the male connector portion of an identical container.

The male connector portion may include an eared post and the female connector portion may include a keyhole, and the ear post may be shaped to fit into the keyhole when the housings are in a non-aligned disposition. Pivoting the housings into an aligned position after inserting the eared post into the keyhole may cause the housings to be locked in an aligned side-by-side arrangement.

The invention also may be embodied in or practiced using a plurality of securement strap kits, each including a container and a securement strap. The securement strap may have a crank. The container may have a housing and a lid. The housing may have a hollow interior adapted to receive the securement strap. The hollow interior may be surrounded by a bottom wall and sidewalls to contain the securement strap, and an open top to receive the securement strap into the hollow interior. The lid may be attached to the housing at the open top by a hinge. The lid may be pivotable relative to the housing about the hinge between a closed position wherein access to the hollow interior is denied and an opened position in which access to the hollow interior is enabled. The lid may be latchable to the housing to deny pivoting relative thereto and thereby deny receipt and removal of the securement strap. A first of the sidewalls may be a right sidewall and a second of the sidewalls may be a left sidewall oppositely-disposed from the right sidewall. One of the right and left sidewalls may include a first connector portion and the other of the right and left sidewalls may include a second connector portion. The first and second connector portions may be matable to enable the plurality of the securement strap kits to be selectably connectable thereby in a side-by-side arrangement.

Each first connector portion may be a male connector portion and each second connector portion may be a female connector portion adapted to receive the male connector portion of an identical securement strap kit.

Each male connector portion may include an eared post and each female connector portion may include a keyhole, and the ear post may be shaped to fit into the keyhole when the housings are in a non-aligned disposition. Pivoting the housings into an aligned position after inserting the eared post of a first of the plurality of securement strap kits into the keyhole of a second of the plurality of securement strap kits may cause the first and second securement strap kits to be locked in an aligned side-by-side arrangement.

At least one of the sidewalls of each housing may have a hole therethrough, the hole being shaped and disposed to allow the associated crank to pass there-through to the exterior of the housing when the securement strap is received into the hollow interior, such that the crank may be used as a handle for carrying the plurality.

Each securement strap may be a ratcheting strap having a free strap sub-assembly and a ratcheting strap sub-assembly selectably connectable thereto and disconnectable therefrom. The associated free and ratcheting strap assemblies may be storable within each hollow interior such that the associated crank may be used as a handle for carrying the combination both when the free and ratcheting strap assemblies are connected to each other and when the free and ratcheting strap assemblies are disconnected from each other.

The invention also may be embodied in or practiced using a container for storing a securement strap. The container may include a housing and a lid. The housing may have a hollow interior adapted to receive the securement strap. The hollow interior may be surrounded by a bottom wall and sidewalls to contain the securement strap, and an open top to receive the securement strap into the hollow interior. At least one of the sidewalls may have a hole therethrough. The lid may be attached to the housing at the open top by a hinge. The lid may be pivotable relative to the housing about the hinge between a closed position wherein access to the hollow interior is denied and an opened position in which access to the hollow interior is enabled. The lid may be latchable to the housing to deny pivoting relative thereto and thereby deny receipt and removal of the securement strap. The hole may be shaped and disposed to allow a crank of the securement strap to pass there-through to the exterior of the housing when the securement strap is received into the hollow interior, such that the crank may be used as a handle for carrying the container and securement strap.

Further features and aspects of the invention are disclosed with more specificity in the detailed description and drawings provided herein.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 10 is a left side view of the kit of FIG. 1;

FIG. 11 is a right side view of the kit of FIG. 1;

FIG. 12 is a partial cross-sectional view through the interlocking post of the container of the kit of FIG. 1.

DETAILED DESCRIPTION OF EXEMPLARY EMBODIMENTS

Figure 1:
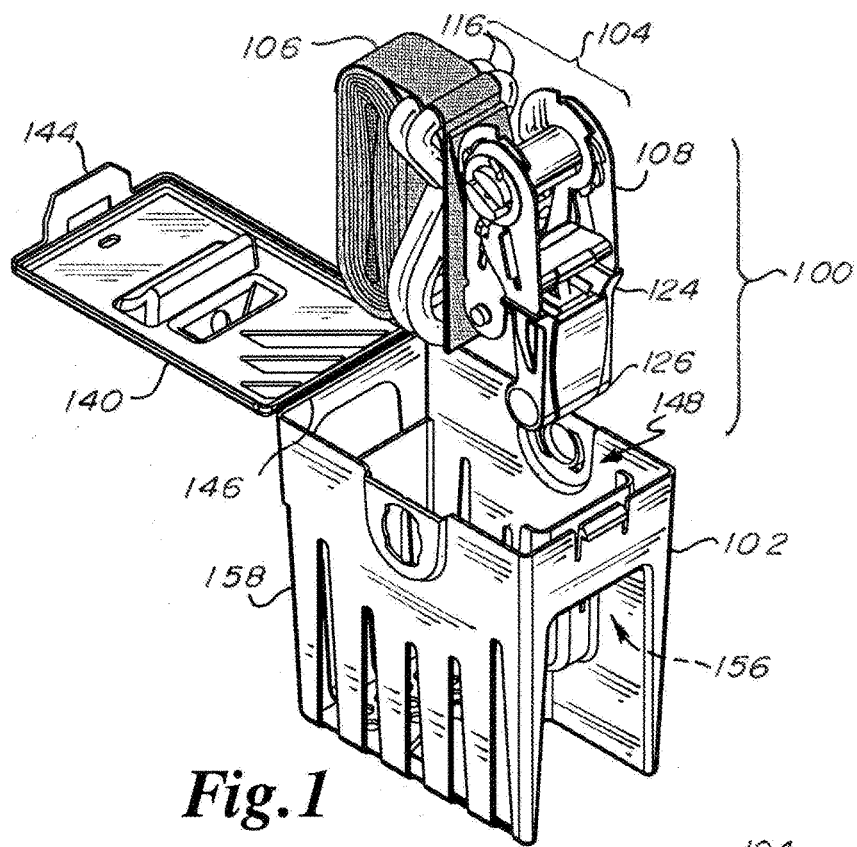
FIG. 1 is an exploded perspective view of a ratcheting strap kit in accordance with an exemplary embodiment.
Figure 2:
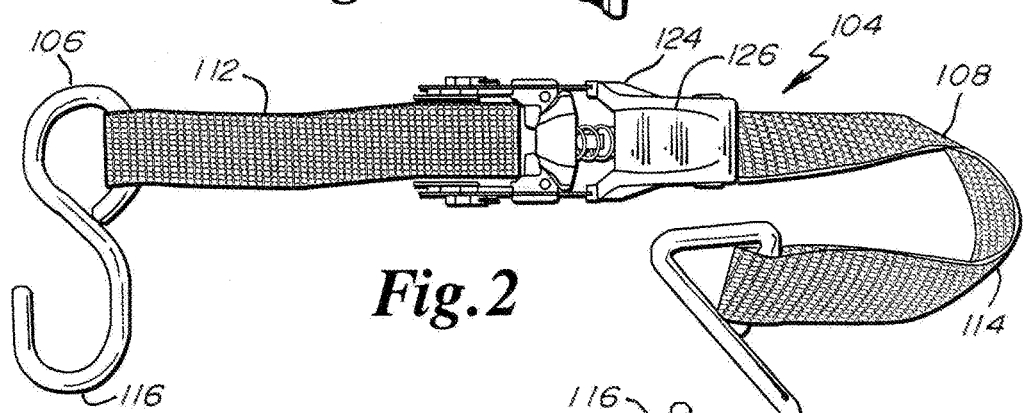
FIG. 2 is a top view of the ratcheting strap the kit of FIG. 1.
Figure 7:
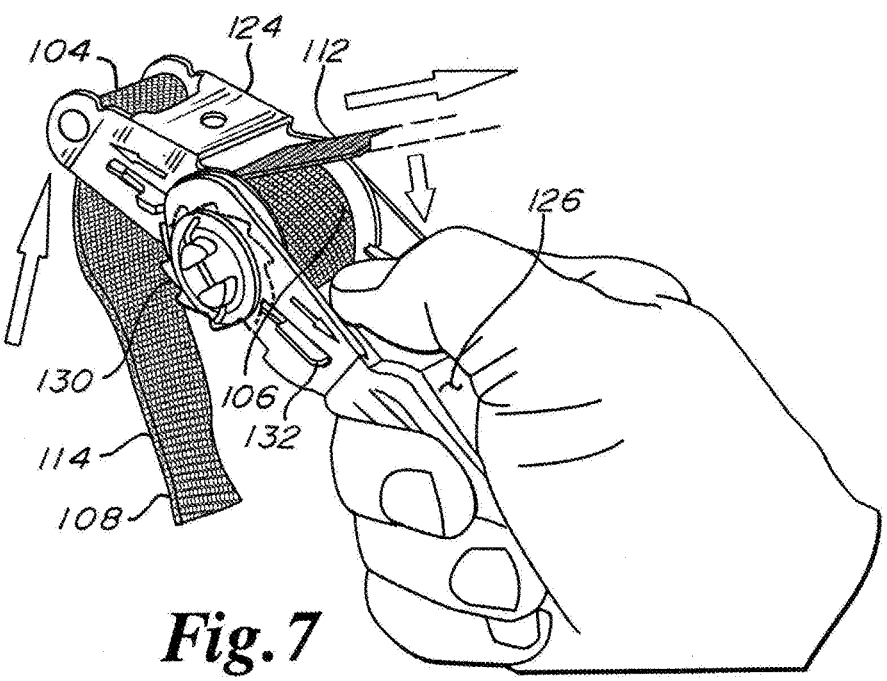
FIG. 7 is a perspective view of the ratcheting strap of FIG. 2 it is swung-fully-opened unlocked position.
Figure 8A:
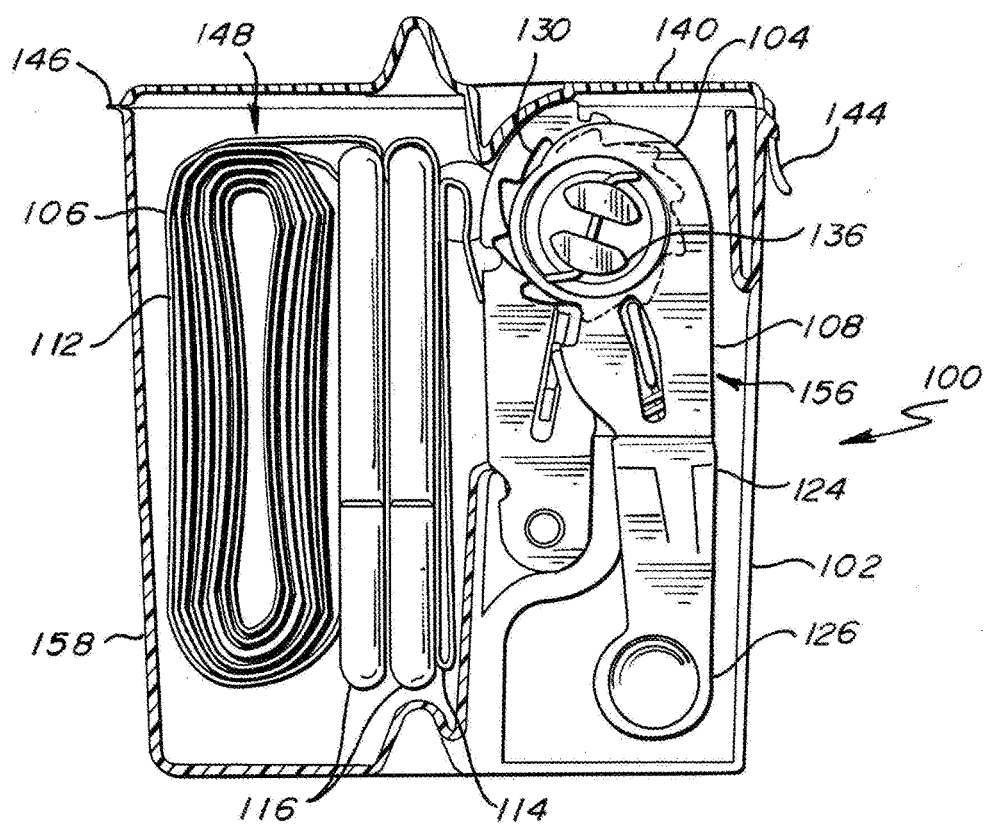
FIG. 8A is a cross-sectional view of the kit of FIG. 1.
Figure 8B:
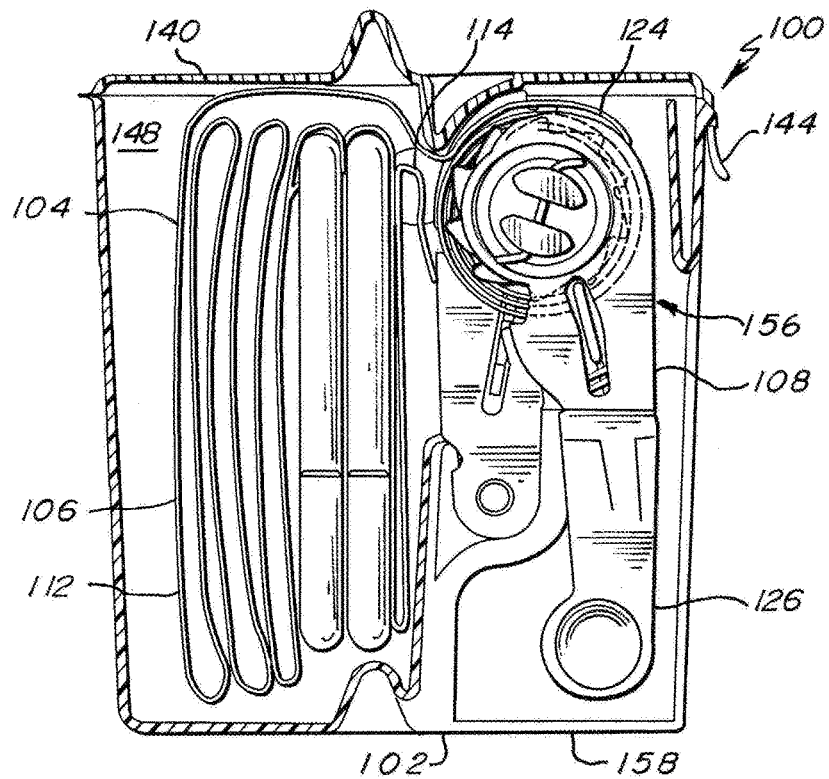
FIG. 8B is a cross-sectional view of the kit of FIG. 1.
Figure 9:
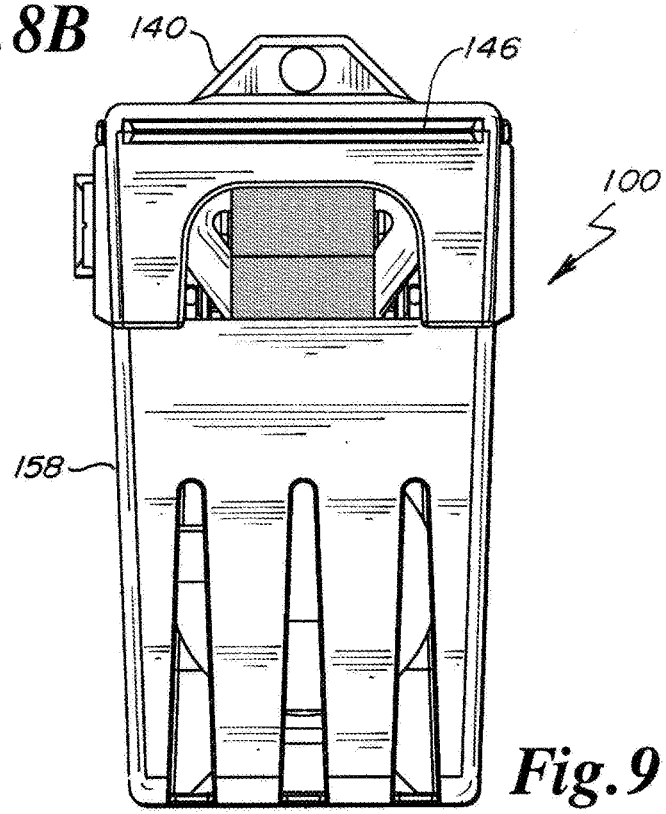
FIG. 9 is a rear view of the kit of FIG. 1.

Referring first to FIGS. 1, 8A, and 8B a kit 100 according to an exemplary embodiment is shown. FIGS. 2 through 7 illustrate an exemplary ratchet strap 104 for use in practicing the invention. The kit includes container 102 and the ratcheting strap. The ratcheting strap includes a free strap sub-assembly 106, and a ratcheting strap sub-assembly 108. The free strap sub-assembly includes long web 112 and ratcheting strap sub-assembly includes short web 114. Each strap sub-assembly includes a hook 116 affixed to a loop formed in a distal hook end of its web. The ratcheting strap sub-assembly includes ratcheting mechanism 124 affixed at its proximal end.

Such ratcheting straps and ratcheting mechanisms are well known in various forms. And while the invention as-a-whole is directed towards a ratcheting strap in combination with a container and forming a cooperative kit, the specific ratcheting strap arrangement and ratcheting mechanism arrangement employed is not fully of consequence to the invention . . . any suitable prior art or later-developed ratcheting strap which can be fit and function as part of such a kit is considered to be within the invention. As examples, ratcheting straps such as those described in U.S. Pat. Nos. 5,271,606 and 7,874,047 are usable within the invention and the teachings of said patents are hereby incorporated herein by reference in their entireties to avoid a lengthy description of well-known matter not critical to the invention.

Figure 3:
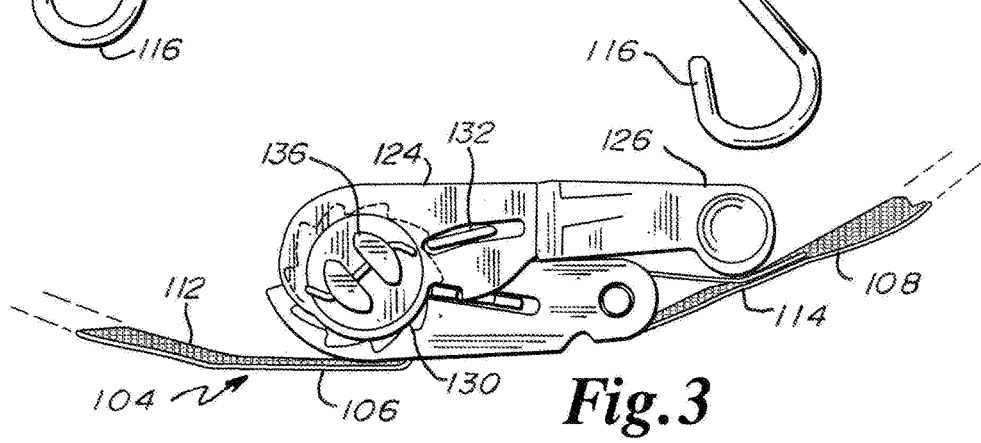
FIG. 3 is a side view of the ratcheting strap of FIG. 2 it is swung-closed ratcheting position.
Figure 4:
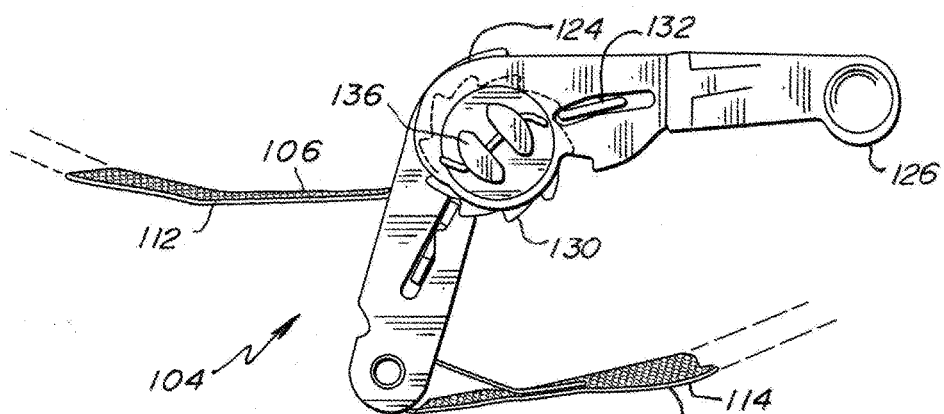
FIG. 4 is a side view of the ratcheting strap of FIG. 2 it is swung-opened ratcheting position.
Figure 5:
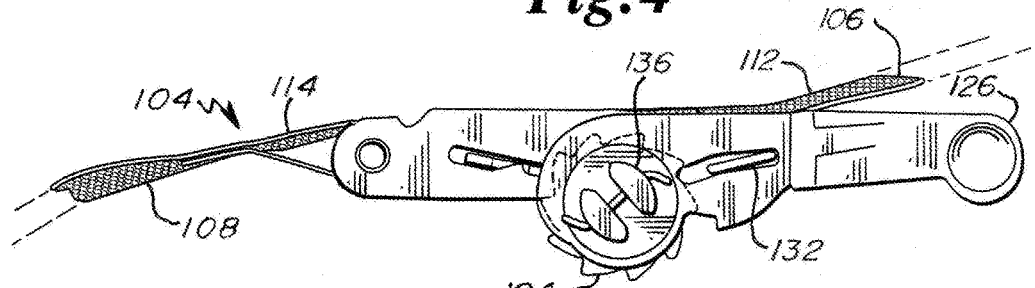
FIG. 5 is a side view of the ratcheting strap of FIG. 2 it is swung-fully-opened unlocked position.
Figure 6:
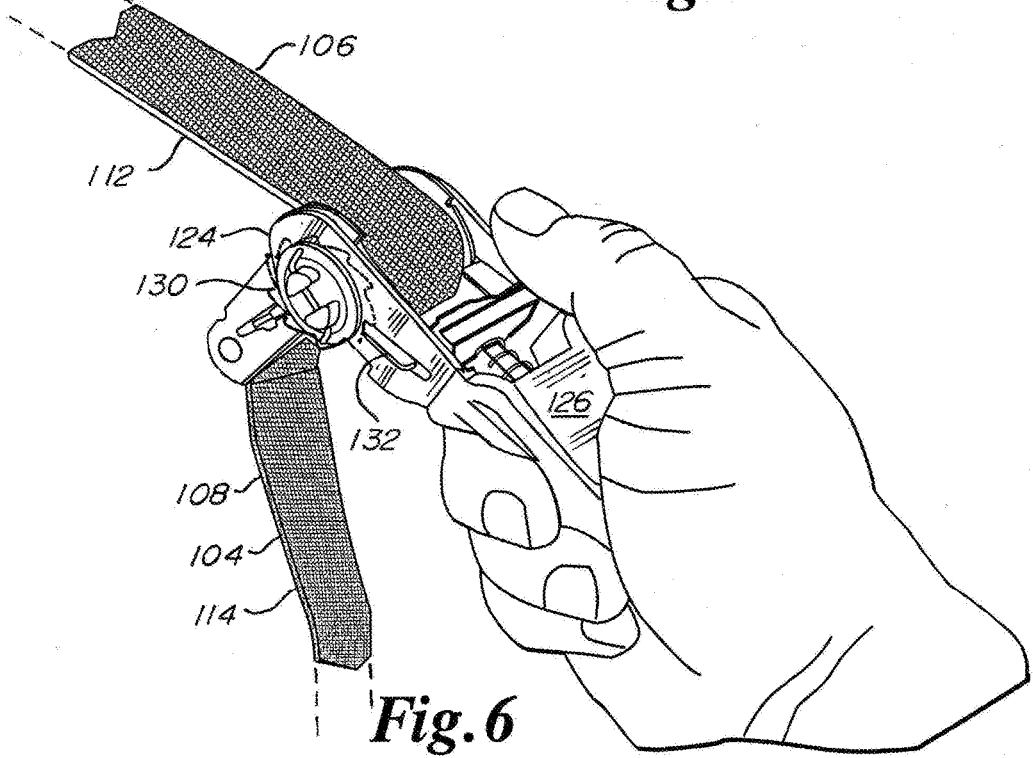
FIG. 6 is a perspective view of the ratcheting strap of FIG. 2 it is swung-opened ratcheting position.

Such ratcheting straps as are usable within the invention have a compact swung-closed ratcheting position shown in FIGS. 3 and 8, in which the crank 126 is moved tightly against the base 128, and have other open positions in which the crank is swung away from the base as in the swung-opened ratcheting positions of FIGS. 4 and 6, and the swung-fully-opened unlocked position of FIGS. 5 and 7. During swung-closed and swung-open ratcheting positions, the toothed ratchet wheel 130 is engaged and locked from rotation by pawl 132 so that the proximal end of free strap sub-assembly is captured in the ratcheting reel 136 and cannot be pulled therefrom. During the swung-fully-opened unlocked position, pawl 132 is disengaged from the toothed ratcheting wheel, allowing the ratcheting reel to rotate freely so that the free strap sub-assembly may be pulled therefrom, both to adjust the length of the free strap sub-assembly's long web 112 that extends form the ratcheting sub-assembly, or to remove the free strap sub-assembly from the ratcheting sub-assembly.

Referring again to FIGS. 1 and 8A, it can be seen that ratcheting strap 104 fits and stores neatly into container 102. Lid 140 is opened by releasing locking tab 144 and swinging the lid back about hinge 146 to expose inner compartment 148. The coiled-up free strap sub-assembly fits within the inner compartment closest to the hinge of the container. The ratcheting strap sub-assembly fits closest to the locking tab. Opening 156 of the container housing 158 is disposed and shaped so that the crank 126 of the ratcheting mechanism protrudes there-though and may be used as a handle to carry the kit when the lid is closed. The crank is preferably of a bright color so that it stands out, both to indicate its usefulness when employing the ratcheting mechanism, and to indicate its usefulness as a handle when the strap is stored in the container.

Alternatively, the long web of the free strap sub-assembly may be left spooled or partially-spooled on the reel 136 of the ratcheting strap sub-assembly, as shown in FIG. 8B, when the ratcheting strap is placed into container 102. This is particularly useful for the situations where the ratchet strap is to be used again to restrain the same item in say the same vehicle. At the end of use of the strap a first time, it is loosened and removed, but it need not be fully disassembled. It may be left at that loosened length and stored in the container as shown, then for use next time it is ready to be re-positioned around the item without the need for any re-sub-assembly.

Referring to FIGS. 9 through 13, it is seen that the container includes connection features for temporarily or permanently ganging numerous of the kits together in side-by-side fashion. Since such ratcheting straps are typically used in groups, this not only allows the user to create and keep together a group of multiple kits, but also allows the manufacturer to more conveniently offer the kits in such a group that is more compact for shipping and retailing.

Figure 13:
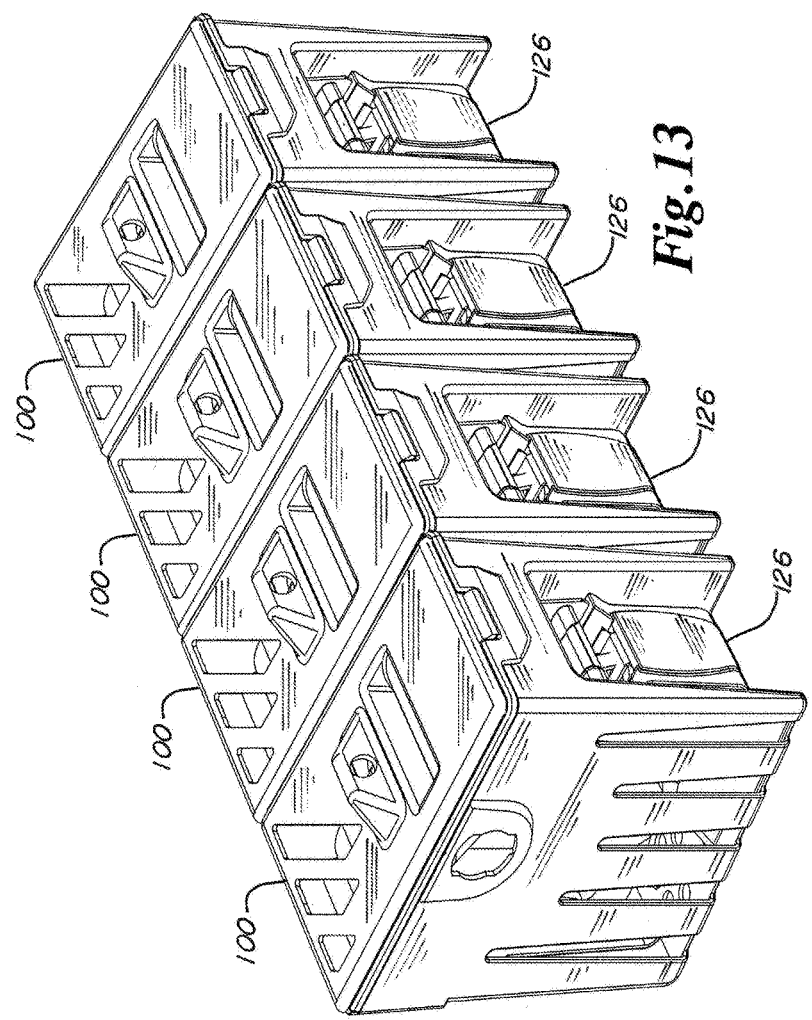
FIG. 13 is a perspective view of four of the kits of FIG. 1 ganged together.

As seen in FIGS. 11 and 12, protruding from the right side of housing 158 is a round post 162 having ears 164 extending there-from. As seen in FIG. 10, the left side of the housing has a mating keyhole that has a round central hole 166 with slots 168 extending therefrom. The slots are positioned such that the post and ears of a first container are receivable into the hole and slots of an adjacent second container only when the two containers are pivoted ninety angular degrees relative to each other. The containers are then pivoted into alignment, whereby the ears are captured by the holes and the adjacent containers are locked together, as seen in FIG. 13.

It should be noted that the embodiment shown herein is not intended to limit the scope of the invention. The invention therefore only be limited by the follow claims, including any equivalent interpretation to which they are entitled.

I claim:

1. A plurality of securement strap kits, each comprising a container and a securement strap:
   the securement strap comprising a crank;
   the container comprising a housing and a lid;
   the housing having a hollow interior adapted to receive the securement strap, the hollow interior surrounded by a bottom wall and sidewalls to contain the securement strap, and an open top to receive the securement strap into the hollow interior;
   the lid being attached to the housing at the open top by a hinge;
   the lid being pivotable relative to the housing about the hinge between a closed position wherein access to the hollow interior is denied and an opened position in which access to the hollow interior is enabled;
   the lid being latchable to the housing to deny pivoting relative thereto and thereby deny receipt and removal of the securement strap; wherein
   a first of the sidewalls is a right sidewall and a second of the sidewalls is a left sidewall oppositely-disposed from the right sidewall, and wherein one of the right and left sidewalls comprises a first connector portion and the other of the right and left sidewalls comprises a second connector portion, and wherein the first and second connector portions are matable to enable the plurality of the securement strap kits to be selectably connectable thereby in a side-by-side arrangement.

2. The plurality of claim 1 wherein each first connector portion is a male connector portion and each second connector portion is a female connector portion adapted to receive the male connector portion of an identical securement strap kit.

3. The plurality of claim 2 wherein each male connector portion comprises an eared post and each female connector portion comprises a keyhole, and the ear post is shaped to fit into the keyhole when the housings are in a non-aligned disposition, and wherein pivoting the housings into an aligned position after inserting the eared post of a first of the plurality of securement strap kits into the keyhole of a second of the plurality of securement strap kits causes the first and second securement strap kits to be locked in an aligned side-by-side arrangement.

4. The plurality of claim 3 wherein at least one of the sidewalls of each housing has a hole therethrough, the hole being shaped and disposed to allow the associated crank to pass there-through to the exterior of the housing when the securement strap is received into the hollow interior, such that the crank may be used as a handle for carrying the plurality.

5. The plurality of claim 4 wherein each securement strap is a ratcheting strap having a free strap sub-assembly and a ratcheting strap sub-assembly selectably connectable thereto and disconnectable therefrom, and wherein the associated free and ratcheting strap assemblies are storable within each hollow interior such that the associated crank may be used as a handle for carrying both sub-assemblies when the free and ratcheting strap assemblies are connected to each other and when the free and ratcheting strap assemblies are disconnected from each other.

6. The plurality of claim 1 wherein at least one of the sidewalls of each housing has a hole therethrough, the hole being shaped and disposed to allow the associated crank to pass there-through to the exterior of the housing when the securement strap is received into the hollow interior, such that the crank may be used as a handle for carrying the plurality.

7. The plurality of claim 6 wherein each securement strap is a ratcheting strap having a free strap sub-assembly and a ratcheting strap sub-assembly selectably connectable thereto and disconnectable therefrom, and wherein the associated free and ratcheting strap assemblies are storable within each hollow interior such that the associated crank may be used as a handle for carrying both sub-assemblies when the free and ratcheting strap assemblies are connected to each other and when the free and ratcheting strap assemblies are disconnected from each other.

* * * * *